United States Patent
Blue et al.

(10) Patent No.: US 12,417,166 B2
(45) Date of Patent: Sep. 16, 2025

(54) SELF DIAGNOSING TEST SUITE USING A DOUBLE PAIR-WISE COMBINATORIAL TEST SOLUTION

(71) Applicant: International Business Machines Corporation, Armonk, NY (US)

(72) Inventors: Dale E. Blue, Poughkeepsie, NY (US); Andrew C. M. Hicks, Highland, NY (US); Ryan Thomas Rawlins, New Paltz, NY (US); Eitan Daniel Farchi, Pardes Hana (IL)

(73) Assignee: International Business Machines Corporation, Armonk, NY (US)

( * ) Notice: Subject to any disclaimer, the term of this patent is extended or adjusted under 35 U.S.C. 154(b) by 312 days.

(21) Appl. No.: 18/194,255

(22) Filed: Mar. 31, 2023

(65) Prior Publication Data

US 2024/0330161 A1    Oct. 3, 2024

(51) Int. Cl.
*G06F 9/44* (2018.01)
*G06F 11/3668* (2025.01)

(52) U.S. Cl.
CPC ...... *G06F 11/3684* (2013.01); *G06F 11/3692* (2013.01)

(58) Field of Classification Search
CPC .......................... G06F 11/3684; G06F 11/3692
See application file for complete search history.

(56) References Cited

U.S. PATENT DOCUMENTS

| | | | |
|---|---|---|---|
| 9,130,839 B1 | 9/2015 | Krzanowski et al. | |
| 10,515,002 B2 * | 12/2019 | Takawale | G06F 11/3688 |
| 10,606,737 B2 * | 3/2020 | Dutta | G06F 11/3684 |
| 11,010,282 B2 | 5/2021 | Hicks et al. | |
| 11,010,285 B2 | 5/2021 | Hicks et al. | |
| 11,032,147 B2 | 6/2021 | Menon | |
| 11,074,495 B2 | 7/2021 | Zadeh et al. | |
| 11,086,768 B1 * | 8/2021 | Hicks | G06F 11/3688 |
| 11,195,057 B2 | 12/2021 | Zadeh et al. | |
| 2020/0242010 A1 * | 7/2020 | Hicks | G06F 11/3676 |
| 2021/0271592 A1 * | 9/2021 | Hicks | G06F 11/3692 |
| 2022/0091967 A1 * | 3/2022 | Wang | G06F 11/3684 |

OTHER PUBLICATIONS

Kuhn, D. Richard, et al. "Combinatorial testing: Theory and practice." Advances in computers 99 (2015): 1-53.

(Continued)

*Primary Examiner* — Qamrun Nahar
(74) *Attorney, Agent, or Firm* — Patterson + Sheridan, LLP

(57) ABSTRACT

Techniques for testing and fault detection are disclosed. These techniques include generating a set of test cases for a system under test (SUT), the set of test cases based on attribute-value pairs modeled as input to the SUT. The techniques further include augmenting the set of test cases. This includes locating a missing counterpart for a first combination of values in a first test case in the set of test cases, based on identifying a number of instances of the first combination of values in the set of test cases, generating a new test case based on modifying the first test case to act as the missing counterpart, and adding the new test case to the set of test cases. The techniques further include identifying a fault for the SUT based on executing the augmented set of test cases.

25 Claims, 6 Drawing Sheets

(56) References Cited

OTHER PUBLICATIONS

Authors et al., "Smart Test Suite for Image Classification," ip.com, IP.com No. IPCOM000255314D, dated Sep. 15, 2018, pp. 1-3.
Authors et al., "Combining combinatorial models while maintaining full coverage," ip.com, IP.com No. IPCOM000237570D, Dated: Jun. 25, 2014, pp. 1-5.
Authors et al., "Inspection Testing Using Debugging Capabilities To Allow Combinational Testing," ip.com, IP.com No. IPCOM000188370D, Dated: Oct. 2, 2009, pp. 1-3.
Authors et al., "Optimal Test Suite Generation Subject to time and cost constraints," ip.com, IP.com No. IPCOM000019887D, Dated: Oct. 7, 2003, pp. 1-4.
Ahmed, Bestoun S. "Generating pairwise combinatorial interaction test suites using single objective dragonfly optimisation algorithm." arXiv preprint arXiv:1905.06734 (2019).

\* cited by examiner

SELF DIAGNOSING TEST SUITE USING A DOUBLE PAIR-WISE COMBINATORIAL TEST SOLUTION

BACKGROUND

The present invention relates to fault detection, and more specifically, to self diagnosing fault detection using combinatorial testing.

SUMMARY

Embodiments include a method. The method includes generating a set of test cases for a system under test (SUT), the set of test cases based on attribute-value pairs modeled as input to the SUT. The method further includes augmenting the set of test cases, including locating a missing counterpart for a first combination of values in a first test case in the set of test cases, based on identifying a number of instances of the first combination of values in the set of test cases, generating a new test case based on modifying the first test case to act as the missing counterpart, and adding the new test case to the set of test cases. The method further includes identifying a fault for the SUT based on executing the augmented set of test cases. As discussed further below, this has numerous advantages, including allowing for generation of augmented test cases based on the set of initial test cases, without requiring further external analysis. This allows for robust and complete self testing across a wide variety of applications that may not have access to external supplementation, including edge computing and embedded hardware tests.

Embodiments further include a system, including a processor and a memory having instructions stored thereon which, when executed on the processor, performs operations. The operations include generating a set of test cases for an SUT, the set of test cases based on attribute-value pairs modeled as input to the SUT. The operations further include augmenting the set of test cases, including: locating a missing counterpart for a first combination of values in a first test case in the set of test cases, based on identifying a number of instances of the first combination of values in the set of test cases, generating a new test case based on modifying the first test case to act as the missing counterpart, and adding the new test case to the set of test cases. The operations further include identifying a fault for the SUT based on executing the augmented set of test cases. As discussed further below, this and the embodiments described below, has numerous advantages, including allowing for generation of augmented test cases based on the set of initial test cases, without requiring further external analysis. This allows for robust and complete self testing across a wide variety of applications that may not have access to external supplementation, including edge computing and embedded hardware tests.

Embodiments further include a computer-readable medium having instructions stored thereon which, when executed by a processor, performs operations. The operations include generating a set of test cases for an SUT, the set of test cases based on attribute-value pairs modeled as input to the SUT. The operations further include augmenting the set of test cases, including: locating a missing counterpart for a first combination of values in a first test case in the set of test cases, based on identifying a number of instances of the first combination of values in the set of test cases, generating a new test case based on modifying the first test case to act as the missing counterpart, and adding the new test case to the set of test cases. The operations further include identifying a fault for the SUT based on executing the augmented set of test cases.

Embodiments further include a method. The method includes generating a set of test cases for an SUT, the set of test cases based on attribute-value pairs modeled as input to the SUT. The method further includes augmenting the set of test cases, including: locating a missing counterpart for a first combination of values in a first test case in the set of test cases, based on identifying a number of instances of the first combination of values in the set of test cases, generating a new test case based on modifying the first test case to act as the missing counterpart, and adding the new test case to the set of test cases.

Embodiments further include a method. The method includes generating a set of test cases for an SUT. The method further includes augmenting the set of test cases, including: locating a plurality of missing counterparts for a plurality of respective combinations of values in a first one or more test cases in the set of test cases, based on identifying a number of instances of the respective combinations of values in the set of test cases, generating a plurality of new test cases based on modifying the one or more first test cases to act as the missing counterparts, and adding the plurality of new test cases to the set of test cases. The method further includes identifying a fault for the SUT based on executing the augmented set of test cases Any of the embodiments described herein optionally includes a feature where locating the missing counterpart for the first combination of values further includes identifying the first combination of values in the first test case, and determining that the set of test cases includes an insufficient number of instances of test cases with the first combination of values. As discussed further below, one or more of these optional features discussed here and below enhances the improvement to debugging and fault detection computer technology because it improves the creation of additional test cases in a manner that is specifically designed to facilitate detection and localization of a fault.

Any of the embodiments described herein optionally includes a feature where the first combination of values includes a first pair of values, and determining that the set of test cases includes the insufficient number of instances of test cases includes determining that the set of test cases includes fewer than two instances of test cases with the first pair of values.

Any of the embodiments described herein optionally includes a feature where generating the new test case based on modifying the first test case to act as the missing counterpart further includes modifying a value in the first test case, other than the first pair of values.

Any of the embodiments described herein optionally includes augmenting the set of test cases by adding a second new test case, based on locating a second missing counterpart for a second combination of values, different from the first combination of values, in the first test case.

Any of the embodiments described herein optionally includes a feature where identifying the fault for the SUT based on executing the augmented set of test cases includes determining a particular combination of values that causes the fault.

Any of the embodiments described herein optionally includes a feature where identifying the fault for the SUT based on executing the augmented set of test cases includes: identifying a second combination of values in a failing test case, locating a counterpart test case for the failing test case, in the augmented set of test cases, where the counterpart test case includes the same second combination of values as the failing test case, and determining that the counterpart test case fails, and in response identifying the second combination of values as the fault.

Any of the embodiments described herein optionally includes a feature where identifying the fault for the SUT based on executing the augmented set of test cases includes: identifying a second combination of values in a failing test case, locating a counterpart test case for the failing test case, in the augmented set of test cases, where the counterpart test case includes the same second combination of values as the failing test case, and determining that the counterpart test case succeeds, and in response identifying the second combination of values as not the fault.

DETAILED DESCRIPTION

Figure 1:
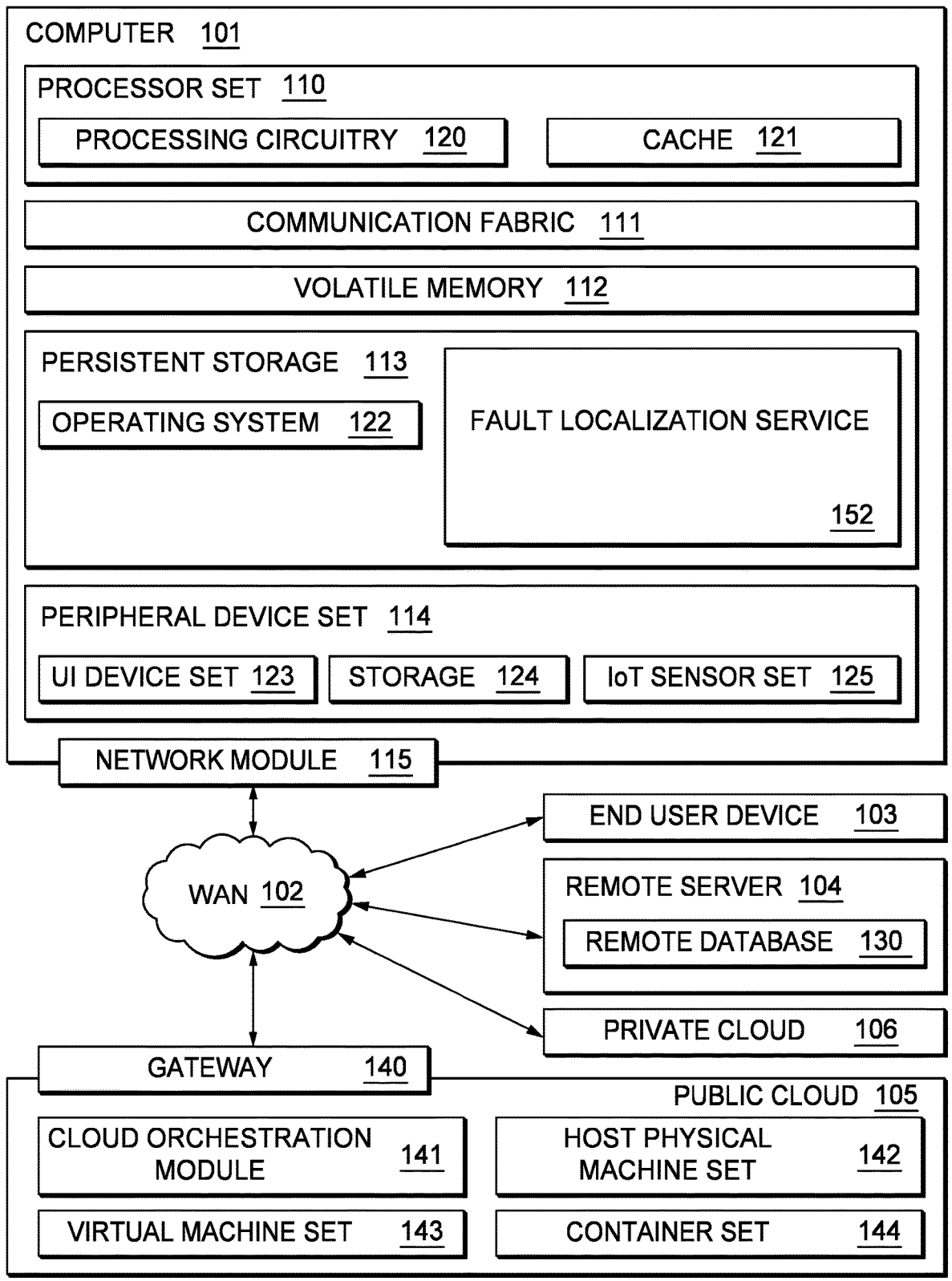
FIG. 1 illustrates a computing environment for self diagnosing fault detection using combinatorial testing, according to one embodiment.

Example embodiments of the invention relate to, among other things, devices, systems, methods, computer-readable media, techniques, and methodologies for performing fault detection and localization using Combinatorial Test Design (CTD) techniques. In example embodiments, the detected and localized fault occurs in a System Under Test (SUT). The SUT may be a hardware system or a software system. Further, in example embodiments, the fault detection and localization may be performed while adhering to architectural restrictions on the SUT.

In example embodiments, inputs to a SUT are modeled as a collection of attribute-value pairs. More specifically, inputs to a SUT can be modeled as a collection of attributes, each of which can take on one or more corresponding attribute values. In example embodiments, the entire Cartesian product space that contains all possible combinations of attribute-value pairs can be reduced to a smaller set of test vectors that provides complete n-wise coverage of the entire test space. This can be accomplished by creating tests that ensure coverage across a subset of model attributes. For instance, if it is assumed that four different attributes A, B, C, and D are modeled, and if it is further assumed that attribute A can take on four distinct values; attribute B can take on three distinct values; attribute C can take on three distinct values; and attribute D can take on two distinct values, then the total number of possible combinations of attribute-value pairs would be 4*3*3*2=72. Thus, in this illustrative example, the entire Cartesian product space would include 72 different combinations of attribute-value pairs. These 72 different combinations of attribute-value pairs can be reduced down to a smaller set of combinations that still provide complete n-wise coverage of the Cartesian product space. For instance, referring to the same example introduced above, if complete pairwise coverage is sought, then the 72 different combinations can be reduced down to 12 distinct combinations that together include every possible pairwise interaction of attribute values. The reduced number of combinations required to provide n-wise coverage may increase logarithmically as n increases.

In example embodiments, the entire Cartesian product space including all combinations of attribute-value pairs is reduced down to a smaller set of CTD test vectors that provides complete n-wise coverage for a desired n. In complex hardware or software systems, the total number of attributes and corresponding candidate attribute values may be quite large, in which case, the total number of possible combinations of attribute values making up the entire Cartesian product space may be astronomically large, making it practically infeasible to test all possible combinations. Reduction of the entire Cartesian product space down to a substantially smaller number of CTD test vectors that still provide complete n-wise coverage allows for any n-wise (or m-wise where m<n) fault to be detected without having to directly test every possible combination in the test space.

In example embodiments, a binary decision diagram or the like may be used to perform the reduction and identify the reduced set of CTD vectors that provides complete n-wise coverage. In example embodiments, each CTD test vector that is generated includes a unique combination of attribute values, and the set of CTD test vectors together include every possible n-wise interaction of attribute values. In particular, each CTD vector may have a dimension corresponding to the number of attributes that are modeled, where each element of the CTD vector is a respective attribute value for a corresponding attribute. The set of CTD vectors that is generated, however, may not be unique. That is, there may be multiple different sets of CTD vectors, each of which provides complete n-wise coverage. In example embodiments, the CTD vectors may be chosen at random while still ensuring complete n-wise coverage. In other example embodiments, the set of CTD vectors may be chosen with specific criteria in mind such as, for example, to increase or decrease the representation of particular attribute values within the set of CTD vectors.

In example embodiments, once the initial set of CTD test vectors are generated, they are used to generate a corresponding set of test cases. For instance, the set of CTD test vectors may be provided as input to a test case generation tool configured to generate a respective corresponding test case for each CTD vector. Each test case may be designed to test the interactions among the particular combination of attribute values contained in the corresponding CTD vector.

In an embodiment, as discussed below in relation to FIG. 3, this initial set of test cases can be augmented to ensure each test case has a corresponding counterpart that can be used for fault identification. N-wise combinations of attribute values may be augmented to generate counterparts for each combination of values. For example, assume a pairwise solution. An initial set of test cases, generated using the initial set of CTD test vectors, can be augmented to include a double pairwise counterpart for every pair of attributes. This augmented set of test cases, including the double pairwise counterpart for each pair of attributes, can be executed, and the results can be used to identify faults. For example, as discussed further below in relation to FIG. 4, the specific attribute-value pairs that cause the error may be identified based on those new test cases that successfully execute.

Example embodiments of the invention include various technical features that yield technical effects that provide various improvements to computer technology. For instance, the automated generation of new test cases in accordance with example embodiments of the invention is capable of exposing a fault more efficiently and using a fundamentally different methodology than manual test case generation. This technical effect represents an improvement to debugging and fault detection computer technology because it automates the creation of additional test cases in a manner that is specifically designed to facilitate detection and localization of a fault.

One or more of the techniques discussed below allow for automated generation of augmented test cases based only on the set of initial test cases, without requiring further external analysis. For example, existing techniques may require external analysis to identify supplemental test cases using inverse combinatorics. But this typically requires access to external resources (e.g., a connection to a suitable communication network or external computing system) and does not allow for rapid or real-time analysis. One or more techniques described herein eliminate any need for external analysis to augment the set of test cases. This allows for robust and complete self testing across a wide variety of applications that may not have access to external supplementation, including edge computing and embedded hardware tests.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as a fault localization service 152 for improved fault localization for testing. In addition to block 152, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 152, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored for block 152 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 152 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2A:
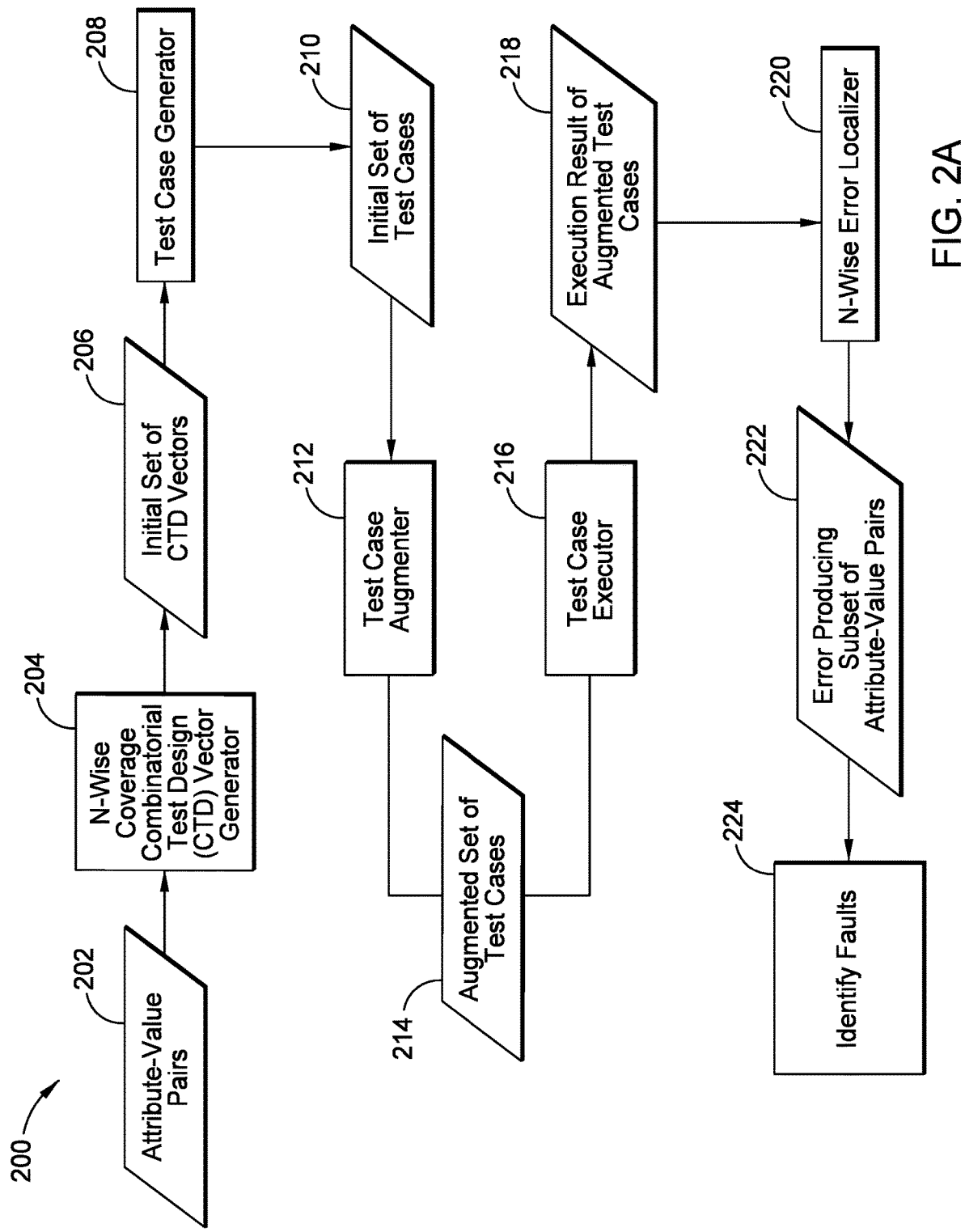
FIG. 2A illustrates a block diagram of fault detection using combinatorial testing, according to one embodiment.

FIG. 2A illustrates a block diagram 200 of fault detection using combinatorial testing, according to one embodiment. In an embodiment, inputs to a SUT are modeled as a collection of attribute-value pairs 202. Any number of attributes may be used to model SUT inputs and each attribute may take on any number of candidate attribute values. An n-wise coverage CTD vector generator 204 takes the attribute-value pairs 202 and generates a set of CTD vectors 206. For example, the set of CTD vectors 206 can provide n-wise coverage of an entire Cartesian product space associated with the collection of attribute-value pairs 202.

In particular, the entire Cartesian product space that contains all possible combinations of the attribute-value pairs 202 is reduced to a smaller set of CTD vectors 206 that provides complete n-wise coverage of the entire test space. In example embodiments, the complete n-wise coverage provided by the set of CTD vectors 206 may be complete pairwise coverage. For instance, if it is assumed that three attributes are modeled, namely, a "name" attribute, a "color" attribute, and a "shape" attribute as shown in FIG. 2C, and if it is further assumed that the "name" attribute can take on 4 distinct attributes (Dale, Rachel, Andrew, and Ryan), the "color" attribute can take on 2 distinct attributes (green, blue), and the "shape" attribute can take on 3 distinct attributes (circle, square, triangle), then the total number of possible combinations of attribute-value pairs would be 4*3*2=24. Thus, in this illustrative example, the entire Cartesian product space would include 24 different combinations of attribute-value pairs. In example embodiments, these 24 different combinations of attribute-value pairs are reduced down to a smaller set of combinations (i.e., the set of CTD vectors 206) that still provides complete n-wise coverage of the Cartesian product space. For instance, if complete pairwise coverage is sought, then the 24 different combinations can be reduced down to 12 distinct combinations that together include every possible pairwise interaction of attribute values. An example set of test cases 270 is shown in FIG. 2C. The example set of test cases 270 includes all pairwise interactions between the attribute values of the attributes "name," "color," and "shape."

In example embodiments, a binary decision diagram or the like may be used to perform the reduction and identify the reduced set of CTD vectors 206 that provides complete n-wise coverage. While each CTD vector in the set of CTD vectors 206 includes a unique combination of attribute values, the set of CTD vectors 206 itself may not be unique. That is, there may be multiple different sets of CTD vectors, each of which provides complete n-wise coverage.

Figure 2B:
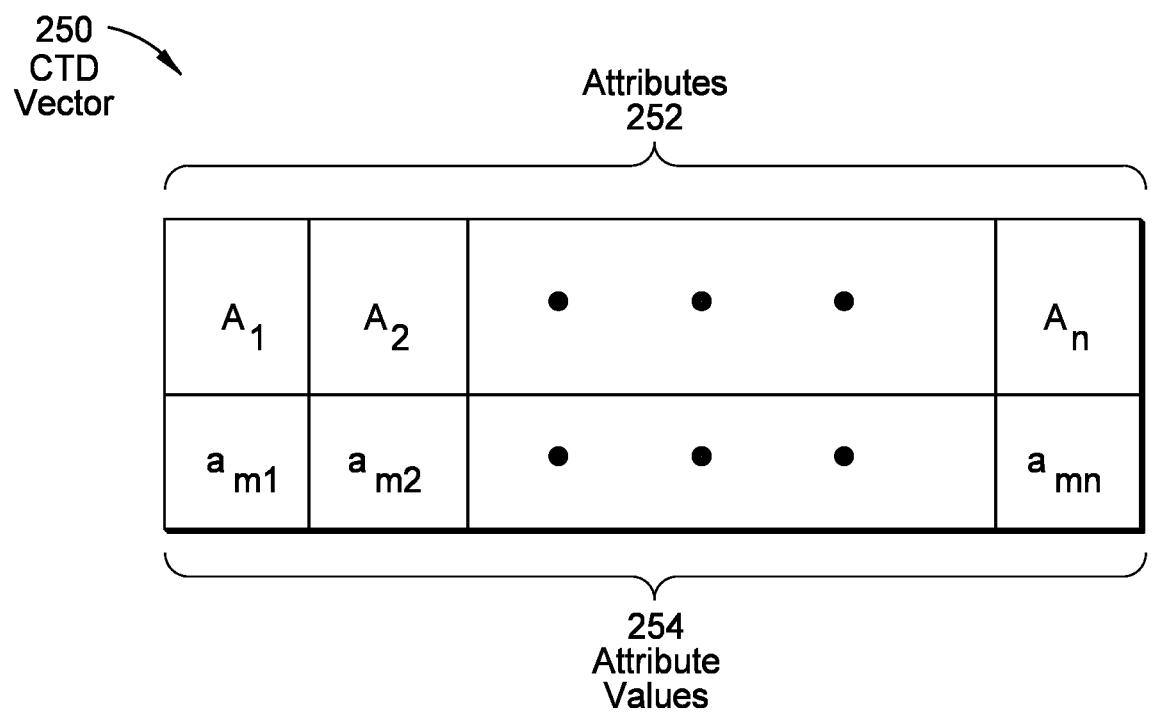
FIG. 2B illustrates an example test vector, according to one embodiment.
Figure 2C:
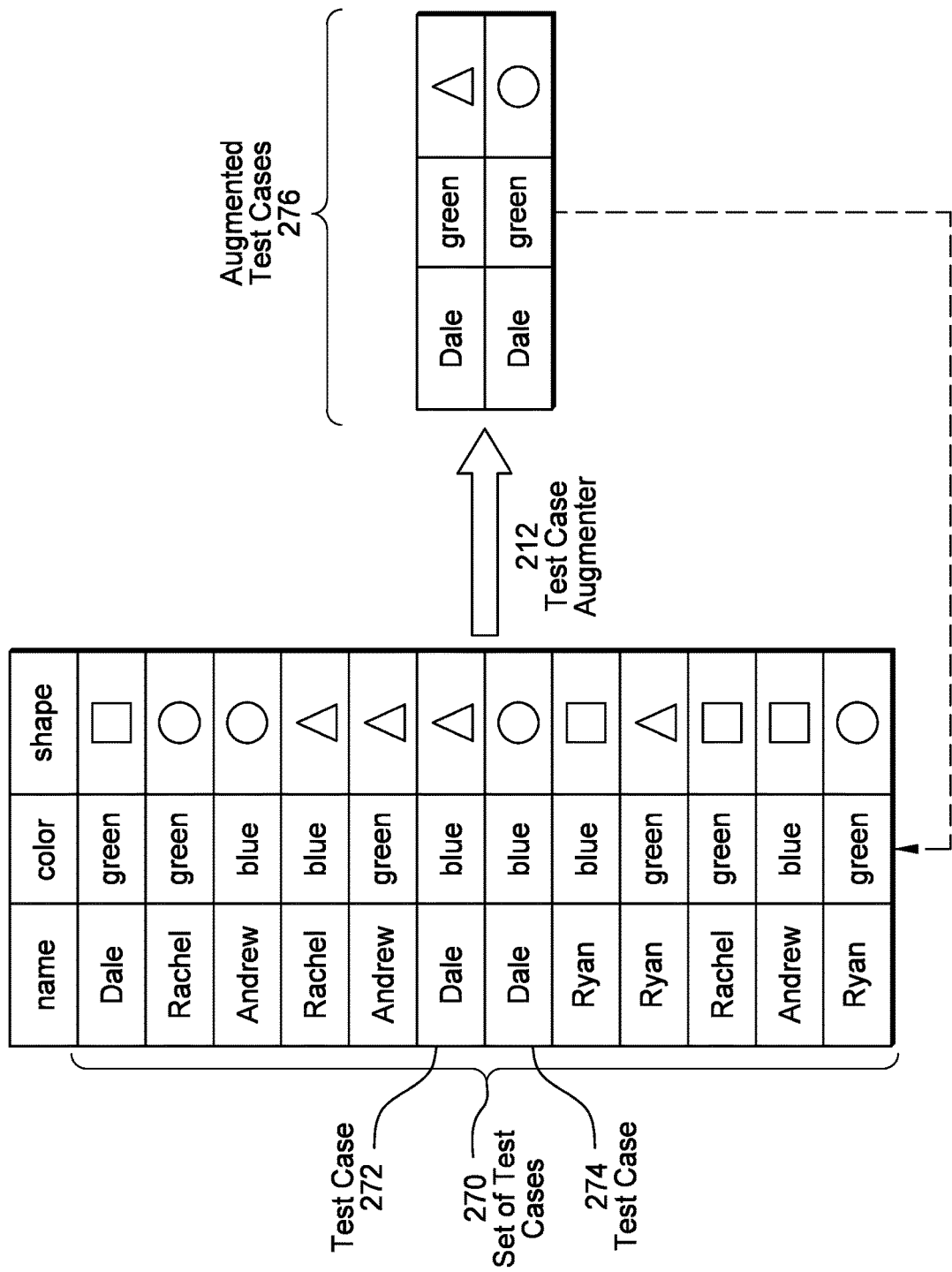
FIG. 2C illustrates n-wise expansion of test cases for fault detection using combinatorial testing, according to one embodiment.

FIG. 2B depicts an example generic CTD vector 250 of the type that may be included in the set of CTD vectors 206, according to one embodiment. The example CTD vector 250 includes a plurality of attributes 252. As previously described, the attributes 252 may be used to model inputs to a SUT. The attributes 252 may be associated with attribute values 254. In particular, each attribute 252 may have a corresponding attribute value 254, which may be one of one or more candidate attribute values that the attribute is allowed to take on.

Returning to FIG. 2A, in an embodiment a test case generator 208 generates, from the set of CTD test vectors 206, a corresponding initial set of test cases 210. For instance, the set of CTD test vectors 206 may be provided as input to a test case generation tool configured to generate a respective corresponding test case for each CTD vector. Each test case in the set of test cases 210 may be designed to test the interactions among the particular combination of attribute values contained in a corresponding CTD vector of the set of CTD vectors 206. It should be appreciated that a set of CTD vectors and their corresponding test cases may, at times herein, be described and/or depicted interchangeably. For instance, the example set of test cases 270 may be interchangeably thought of as a set of CTD test vectors.

In an embodiment, the initial set of test cases 210 is provided to a test case augmenter 212. In an embodiment, the test case augmenter 212 identifies n-wise combinations of attributes (e.g., pairwise combinations of attributes) that are lacking sufficient counterparts to automatically identify faults. This is discussed further, below, with regard to FIG. 3. The test case augmenter 212 generates an augmented set of test cases 214 that can be used to identify faults. This is discussed further, below, with regard to FIG. 4.

A test case executor 216 is executed to determine whether any test cases in the augmented set of test cases 214 failed. In example embodiments, execution of each test case 214 results in either a successful execution result, indicating that the combination of attribute values contained in the corresponding CTD vector 206 does not contain an n-wise (or m-wise where m<n) error, or a failure execution result, indicating that the combination of attribute values in the corresponding CTD vector 206 does contain an n-wise (or m-wise where m<n) error.

Referring to the example depicted in FIG. 2C, a set of test cases 270 are executed to yield a respective execution result for each test case. In particular, two test cases 272 and 274 are illustratively depicted in FIG. 2C. Assume the test cases 272 and 274 are failing tests. The test case 272 tests the following combination of attribute values: Dale; blue; triangle, which respectively correspond to the attributes name, color, and shape. The test case 274 tests the following combination of attribute values: Dale; blue; circle, which respectively correspond to the attributes name, color, and shape. Although "Dale" and "blue" are present both in the CTD vector corresponding to the test case 272 and in the CTD vector corresponding to the test case 274, it is unclear, based on these test cases, whether "Dale" and "blue" are generating a pairwise error; whether "Dale" and ("triangle" or "circle") are generating the pairwise errors; or whether "blue" and "triangle" or "circle") are generating the pairwise errors.

In an embodiment, the test case augmenter 212 can be used to generate augmented test cases 276. The augmented test cases 276 include pairwise counterparts to ensure that each pairwise combination of attributes (e.g., in the test cases 272 and 274) includes a counterpart. For example, the augmented test cases ensure that all of <Dale, blue>, <Dale, triangle>, <Dale, circle>, <blue, triangle>, and <blue, circle> appear at least twice in the augmented set of test cases. This is discussed further, below, with regard to FIG. 3. Further, while the augmented test cases 276 illustrate augmented examples for the test cases 272 and 274, in an embodiment the test cases augmenter 212 creates suitable augmented test cases for the complete set of test cases relating to the set of test cases 270. That is, the augmented test cases 276 represent an intermediate result, for illustration purposes. As discussed below in relation to FIG. 3 the test case augmenter 212 can generate additional augmented test cases to ensure that each pair in the set of test cases 270 includes a suitable counterpart.

Returning to FIG. 2A, the test case executor 216 generates execution results 218 from augmented set of test cases 214. One or more n-wise error localizers 220 are executed to detect and localize an error (e.g., n-wise or lesser order error) based on the attributes and their corresponding failing attribute values in their n-wise counterpart(s), including augmented counterpart(s) generated by the test case augmenter 212. This is discussed further, below, with regard to FIG. 4.

Returning again to FIG. 2A, the error producing subset of attribute-value pairs 222 can be used to identify faults. For example, the attribute-value pairs 222 identify one or more attributes that led to faults identified with the test case executor 216. This can be used identify faults 224 and take appropriate action to identify or resolve the fault, including providing an alert, allowing for automated correction, or taking any other suitable action.

Figure 3:
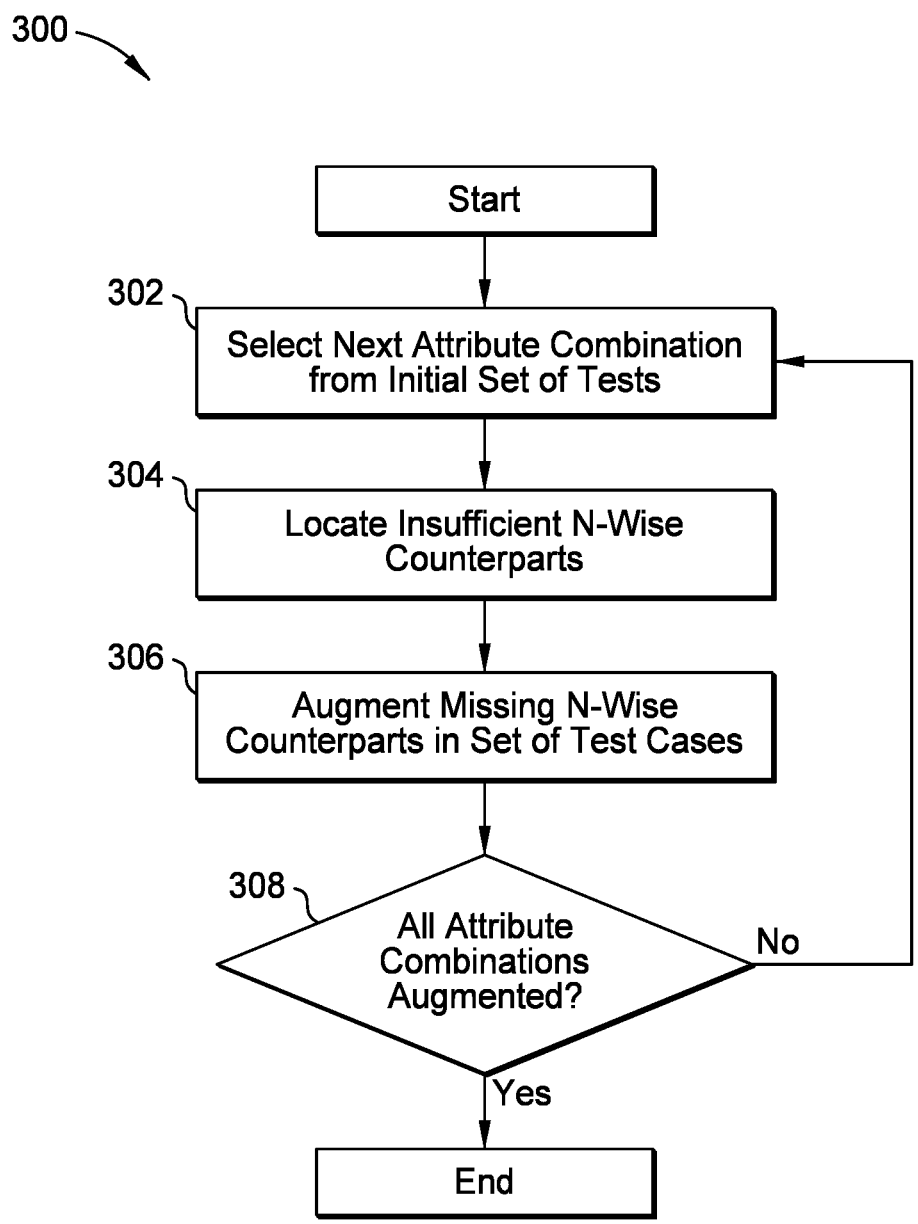
FIG. 3 is a flowchart illustrating generating augmented n-wise test cases for self diagnosing fault detection using combinatorial testing, according to one embodiment.

FIG. 3 is a flowchart 300 illustrating generating augmented n-wise test cases for self diagnosing fault detection using combinatorial testing, according to one embodiment. In an embodiment, FIG. 3 provides example techniques for the test case augmenter 212 illustrated in FIG. 2A and discussed above. At block 302, a fault localization service (e.g., the fault localization service 152 illustrated in FIG. 1) selects a next attribute combination from an initial set of CTD test cases (e.g., the initial set of test cases 210 illustrated in FIG. 2).

For example, using the example depicted in FIG. 2C, the test case 272 includes the attribute values <Dale, blue, triangle>. The fault localization service identifies the test case 272, and selects a next pair of attributes (e.g., the name attribute "Dale" and the color attribute "blue" or the shape attribute "triangle"). In an embodiment, the fault localization service uses any suitable technique to identify the next pair attributes.

At block 304, the fault localization service locates insufficient n-wise counterparts. In an embodiment, the goal of the fault localization service is to generate additional test cases so that each combination of attributes, in an initial set of CTD test cases, has a respective counterpart that can be used to identify fault (e.g., as discussed below in relation to FIG. 4). The fault localization service locates, for the selected attribute pair, insufficient n-wise combinations with other attributes.

For example, assume a pairwise implementation using the test cases illustrated in FIG. 2C. The fault localization service selects the attribute pair "Dale" and "blue" from the test case 272 that includes the attribute values <Dale, blue, triangle>. The fault localization service identifies whether "Dale" and "blue" has a counterpart in the set of test cases.

For example, in the example pairwise implementation, the fault localization service ensure that there are at least two instances of <Dale, blue> in the set of test cases 270. As illustrated, the set of test cases 270 includes two instances of <Dale, blue>: <Dale, blue, triangle> (e.g., in the test case 272) and <Dale, blue, circle> (e.g., in the test case 274). Thus, the combination <Dale, blue> is not missing a counterpart.

Assume, however, that the fault localization service selects the attribute pair "Dale" and "triangle" from the test case 272. The set of test cases 270 includes only one instance of <Dale, triangle> (e.g., the test case 272). Thus, the fault localization service identifies <Dale, triangle> as a missing pairwise counterpart. As noted, this is merely an example, and the fault localization service can identify any n-wise missing combinations.

At block 306, the fault localization service augments the missing n-wise test counterparts in the set of test cases. For example, as noted above the fault localization service identifies <Dale, triangle> as a missing pairwise counterpart from the test case 272. In an embodiment, the fault localization service augments the set of test cases by adding an additional test in which another attribute, other than <Dale, triangle>, is changed from the test case 272. In an embodiment, any attribute other than the pair under analysis can be changed, and this attribute can be changed to have any valid value. Thus, the fault localization service generates the new test case <Dale, green, triangle>, and adds this test case to the set of test cases 270.

At block 308, the fault localization service determines whether all attributes have been augmented (e.g., for a given failed test). If so, the flow ends. If not, the flow returns to block 302 and the fault localization service selects the next attributes.

For example, using the example of the test case 272 illustrated in FIG. 2C, the fault localization service determines that all attribute combinations have not been augmented (e.g., only the pair <Dale, blue> or <Dale, triangle> has been augmented). The fault localization service selects the next attribute pair (e.g., the color attribute "blue" and the shape attribute "triangle") and proceeds with blocks 302-306, identifying whether <blue, triangle> is missing a counterpart, and augmenting appropriately.

In an embodiment, the fault localization service uses the augmented set of test cases, including test cases added by the previous pass through blocks 302-306 (e.g., including the addition of <Dale, green, triangle> as discussed above), to identify missing counterparts. Building the set of test cases in this way can have significant advantages, because each iteration through blocks 302-306 adds augmented counterparts that apply to not only the pair under analysis, but potentially other pairs as well. For example, adding <Dale, green, triangle>, as discussed above, adds a counter part for <Dale, triangle>. But it also adds a counterpart for <Dale, green>, and for <green, triangle>. If either of those attribute pairs was previously missing a counterpart in the set of test cases, the counterpart will no longer be missing. Thus, the number of augmented test cases drops significantly as the fault localization service iterates through the attribute combinations at blocks 302-306.

Further, in an embodiment, the techniques illustrated in FIG. 3 are applied to each test case in the set of test cases. For example, these techniques can be applied to the test case 274, resulting in the addition of the test case <Dale, green, circle> to augment the missing pairwise combination <Dale, circle>.

Figure 4:
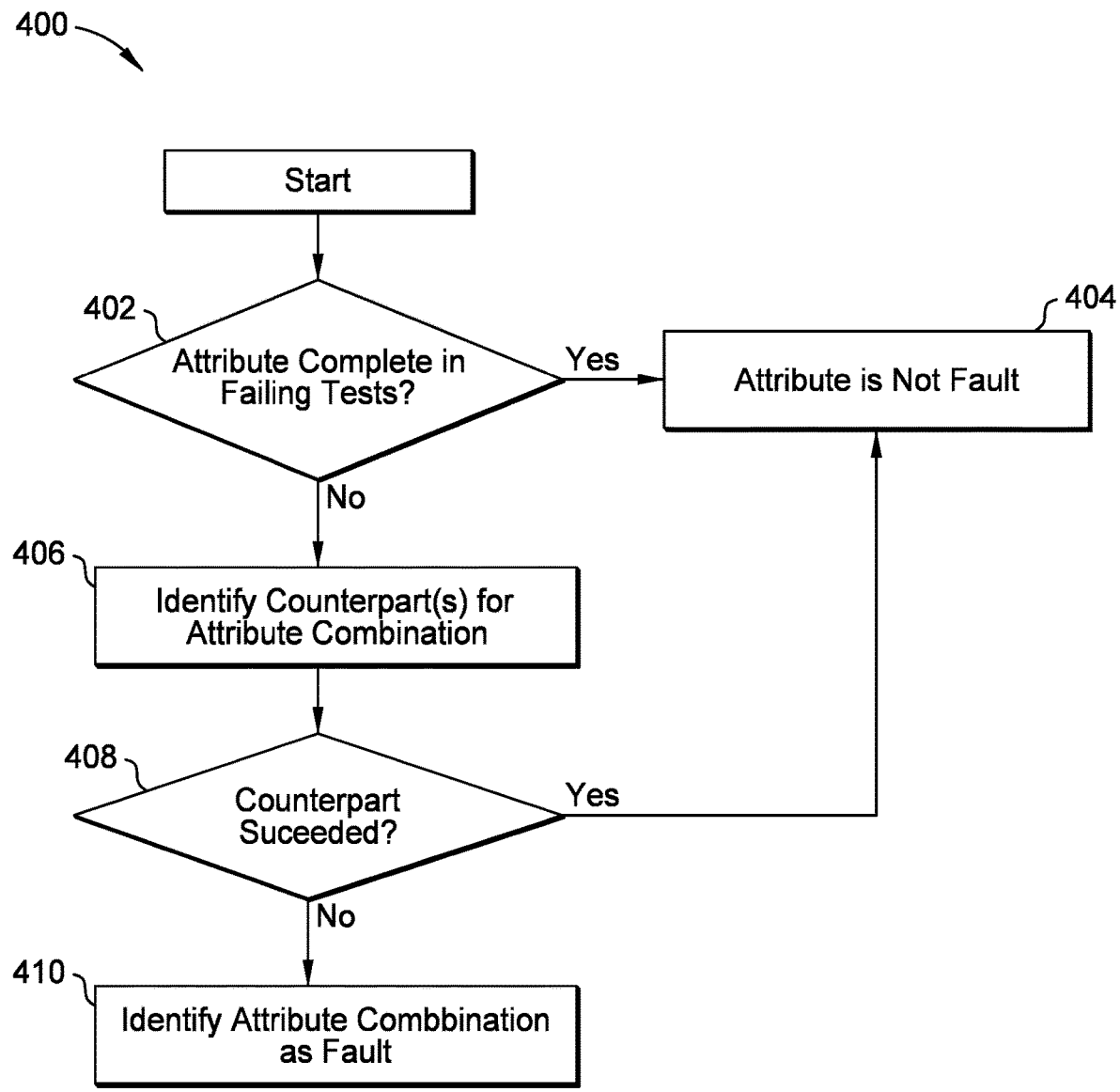
FIG. 4 is a flowchart illustrating identifying fault using combinatorial testing, according to one embodiment.

FIG. 4 is a flowchart 400 illustrating identifying fault using combinatorial testing, according to one embodiment. In an embodiment, FIG. 4 provides example techniques for the n-wise error localizer 220 illustrated in FIG. 2A and discussed above. In an embodiment, as illustrated in FIG. 2A, the techniques in FIG. 4 are used to assess execution results 218 for the augmented set of test cases 214 to detect and localize an n-wise or lesser order error based on those new test cases that yield a successful execution result. For example, a lesser order error can refer to an m-wise error where m<n, assuming complete n-wise coverage by the set of CTD vectors 206.

At block 402, a fault localization service (e.g., the fault localization service 152 illustrated in FIG. 1) determines whether any attribute is complete in the failing tests (e.g., whether every possible value for the attribute is present in the failing tests). If so, the flow proceeds to block 404 and the attribute is not the fault. If not, the flow proceeds to block 406.

In an embodiment, determining whether the attribute is complete in the failing tests provides a shortcut to determine that an attribute is not the cause of the fault. This works because we assume at least some tests pass. If an attribute has failed with every possible value, then the attribute must not be the source of the fault. The value of the attribute is independent from the success or failure of the test, and so the value of the attribute cannot be the cause of the fault.

At block 406, the fault localization service identifies one or more counterparts for the attribute combination in each failed test. For example, using the example of FIG. 2C described above, assume the test case 272 fails and the fault localization service is examining the attribute combination <Dale, blue>. The fault localization service identifies any counterparts to the combination <Dale, blue> in the set of test cases 270 (e.g., including the addition of the augmented test cases 276). As discussed above, there is guaranteed to be at least one counterpart to <Dale, blue>, because of the augmenting described above in relation to FIG. 3, but there may be more than one. In an embodiment, the fault localization service identifies each of the counterparts. In the example of FIG. 2C, the only counterpart to <Dale, blue> from the test case 272 is the test case 274.

At block 408, the fault localization service determines whether the counterpart succeeded. If so, the flow proceeds to block 404 and the attribute combination is not the cause of the fault. If not, the flow proceeds to block 410 and the fault localization service identifies the attribute combination as the fault.

Using our example of FIG. 2C again, the counterpart to the combination <Dale, blue> in the failing test 272 is in the test 274. But assume the test 274 also fails. Because the counterpart also fails, the fault localization service identifies the combination of <Dale, blue> as a fault.

Another example may also be instructive. Using the example from FIG. 2C, assume the fault localization service analyzes the combination <Dale, triangle> from the failing test case 272. At block 402, none of the attributes name, color, or shape, are complete in the failing tests, so the flow proceeds to block 406.

At block 406, the fault localization service identifies the counterpart to <Dale, triangle> as one of the augmented test cases 276: <Dale, green, triangle>. Assume <Dale, green, triangle> passes. At block 408, the fault localization service determines that this test case passes, and so <Dale, triangle> is not a fault. The augmenting of the set of test cases 270 with the augmented test cases 276 has allowed the fault localization service to rule out <Dale, triangle> as a fault. Stated more generally, and using the block diagram illustrated in FIG. 2A, the fault localization service can determine the specific attribute-value pairs that cause an n-wise or lesser order error based on an assessment of the execution results 218 for the augmented set of test cases 214.

While the foregoing is directed to embodiments of the present invention, other and further embodiments of the invention may be devised without departing from the basic scope thereof, and the scope thereof is determined by the claims that follow.

What is claimed is:

1. A method comprising:
    generating a set of test cases for a system under test (SUT), the set of test cases based on attribute-value pairs modeled as input to the SUT;
    augmenting the set of test cases, comprising:
        locating a missing counterpart for a first combination of values in a first test case in the set of test cases, based on identifying a number of instances of the first combination of values in the set of test cases;
        generating a new test case based on modifying the first test case to act as the missing counterpart; and
        adding the new test case to the set of test cases; and
    identifying a fault for the SUT based on executing the augmented set of test cases.

2. The method of claim 1, wherein locating the missing counterpart for the first combination of values further comprises:
    identifying the first combination of values in the first test case; and
    determining that the set of test cases comprises an insufficient number of instances of test cases with the first combination of values.

3. The method of claim 2,
    wherein the first combination of values comprises a first pair of values; and
    wherein determining that the set of test cases comprises the insufficient number of instances of test cases comprises determining that the set of test cases comprises fewer than two instances of test cases with the first pair of values.

4. The method of claim 3, wherein generating the new test case based on modifying the first test case to act as the missing counterpart further comprises:
    modifying a value in the first test case, other than the first pair of values.

5. The method of claim 4, further comprising:
    augmenting the set of test cases by adding a second new test case, based on locating a second missing counterpart for a second combination of values, different from the first combination of values, in the first test case.

6. The method of claim 1, wherein identifying the fault for the SUT based on executing the augmented set of test cases comprises determining a particular combination of values that causes the fault.

7. The method of claim 1, wherein identifying the fault for the SUT based on executing the augmented set of test cases comprises:
    identifying a second combination of values in a failing test case;
    locating a counterpart test case for the failing test case, in the augmented set of test cases, wherein the counterpart test case comprises the same second combination of values as the failing test case; and
    determining that the counterpart test case fails, and in response identifying the second combination of values as the fault.

8. The method of claim 1, wherein identifying the fault for the SUT based on executing the augmented set of test cases comprises:
    identifying a second combination of values in a failing test case;
    locating a counterpart test case for the failing test case, in the augmented set of test cases, wherein the counterpart test case comprises the same second combination of values as the failing test case; and
    determining that the counterpart test case succeeds, and in response identifying the second combination of values as not the fault.

9. A system, comprising:
    a processor; and
    a memory having instructions stored thereon which, when executed on the processor, performs operations comprising:
        generating a set of test cases for a system under test (SUT), the set of test cases based on attribute-value pairs modeled as input to the SUT;
        augmenting the set of test cases, comprising:
            locating a missing counterpart for a first combination of values in a first test case in the set of test cases, based on identifying a number of instances of the first combination of values in the set of test cases;
            generating a new test case based on modifying the first test case to act as the missing counterpart; and
            adding the new test case to the set of test cases; and
        identifying a fault for the SUT based on executing the augmented set of test cases.

10. The system of claim 9, wherein locating the missing counterpart for the first combination of values further comprises:
    identifying the first combination of values in the first test case; and
    determining that the set of test cases comprises an insufficient number of instances of test cases with the first combination of values.

11. The system of claim 10,
    wherein the first combination of values comprises a first pair of values; and
    wherein determining that the set of test cases comprises the insufficient number of instances of test cases comprises determining that the set of test cases comprises fewer than two instances of test cases with the first pair of values.

12. The system of claim 11, wherein generating the new test case based on modifying the first test case to act as the missing counterpart further comprises:
    modifying a value in the first test case, other than the first pair of values.

13. The system of claim 9, wherein identifying the fault for the SUT based on executing the augmented set of test cases comprises determining a particular combination of values that causes the fault.

14. The system of claim 9, wherein identifying the fault for the SUT based on executing the augmented set of test cases comprises:
    identifying a second combination of values in a failing test case;
    locating a counterpart test case for the failing test case, in the augmented set of test cases, wherein the counterpart test case comprises the same second combination of values as the failing test case; and determining that the counterpart test case fails, and in response identifying the second combination of values as the fault.

15. A computer readable storage medium having instructions stored thereon which, when executed by a processor, performs operations comprising:
generating a set of test cases for a system under test (SUT), the set of test cases based on attribute-value pairs modeled as input to the SUT;
augmenting the set of test cases, comprising:
locating a missing counterpart for a first combination of values in a first test case in the set of test cases, based on identifying a number of instances of the first combination of values in the set of test cases;
generating a new test case based on modifying the first test case to act as the missing counterpart; and
adding the new test case to the set of test cases; and
identifying a fault for the SUT based on executing the augmented set of test cases.

16. The computer readable storage medium of claim 15, wherein locating the missing counterpart for the first combination of values further comprises:
identifying the first combination of values in the first test case; and
determining that the set of test cases comprises an insufficient number of instances of test cases with the first combination of values.

17. The computer readable storage medium of claim 16 wherein the first combination of values comprises a first pair of values; and
wherein determining that the set of test cases comprises the insufficient number of instances of test cases comprises determining that the set of test cases comprises fewer than two instances of test cases with the first pair of values.

18. The computer readable storage medium of claim 17, wherein generating the new test case based on modifying the first test case to act as the missing counterpart further comprises:
modifying a value in the first test case, other than the first pair of values.

19. The computer readable storage medium of claim 15, wherein identifying the fault for the SUT based on executing the augmented set of test cases comprises determining a particular combination of values that causes the fault.

20. The computer readable storage medium of claim 15, wherein identifying the fault for the SUT based on executing the augmented set of test cases comprises:
identifying a second combination of values in a failing test case;
locating a counterpart test case for the failing test case, in the augmented set of test cases, wherein the counterpart test case comprises the same second combination of values as the failing test case; and
determining that the counterpart test case fails, and in response identifying the second combination of values as the fault.

21. A method comprising:
generating a set of test cases for a system under test (SUT), the set of test cases based on attribute-value pairs modeled as input to the SUT; and
augmenting the set of test cases, comprising:
locating a missing counterpart for a first combination of values in a first test case in the set of test cases, based on identifying a number of instances of the first combination of values in the set of test cases;
generating a new test case based on modifying the first test case to act as the missing counterpart; and
adding the new test case to the set of test cases.

22. The method of claim 21, further comprising:
determining a particular combination of values that causes a fault for the SUT based on executing the augmented set of test cases.

23. A method, comprising:
generating a set of test cases for a system under test (SUT);
augmenting the set of test cases, comprising:
locating a plurality of missing counterparts for a plurality of respective combinations of values in a first one or more test cases in the set of test cases, based on identifying a number of instances of the respective combinations of values in the set of test cases;
generating a plurality of new test cases based on modifying the one or more first test cases to act as the missing counterparts; and
adding the plurality of new test cases to the set of test cases; and
identifying a fault for the SUT based on executing the augmented set of test cases.

24. The method of claim 23, wherein each of the respective combinations of values comprises a respective pair of values.

25. The method of claim 24, wherein locating the plurality of missing counterparts for the respective combinations of values further comprises:
determining that the set of test cases comprises fewer than two instances of test cases with the respective pair of values.

* * * * *